United States Patent
Lomasney et al.

(10) Patent No.: US 6,261,631 B1
(45) Date of Patent: Jul. 17, 2001

(54) METHOD FOR CONTROLLING WET FILM THICKNESS OF CLEAR COATINGS BY MEANS OF COLOR-DISSIPATING DYE

(75) Inventors: Henry Lomasney, Leawood Kansas; Perry Kilpatrick; Shirish Pandit, both of Kansas City, all of MO (US)

(73) Assignee: Tnemec Company, Inc., North Kansas City, MO (US)

( * ) Notice: Subject to any disclaimer, the term of this patent is extended or adjusted under 35 U.S.C. 154(b) by 0 days.

(21) Appl. No.: 09/469,328

(22) Filed: Dec. 22, 1999

Related U.S. Application Data

(60) Provisional application No. 60/113,498, filed on Dec. 22, 1998.

(51) Int. Cl.[7] ............................ B05D 1/38; D06P 5/13
(52) U.S. Cl. ........................ 427/9; 427/553; 427/407.1; 8/403
(58) Field of Search ............... 8/403; 427/553, 427/407.1, 9

(56) References Cited

U.S. PATENT DOCUMENTS

| | | | |
|---|---|---|---|
| 3,930,063 | * 12/1975 | Miller et al. | 427/54 |
| 3,975,554 | * 8/1976 | Kummins et al. | 427/8 |
| 5,071,440 | * 12/1991 | Hines et al. | 8/403 |
| 5,108,460 | * 4/1992 | Hines et al. | 8/403 |
| 5,548,010 | 8/1996 | Franer | 524/198 |

* cited by examiner

Primary Examiner—Erma Cameron
(74) Attorney, Agent, or Firm—Foley & Lardner

(57) ABSTRACT

A method for controlling uniformity of applied film thickness of clear protective coatings by means of a color-dissipatable dye additive which dissipates within a reasonable timeframe, generally from hours to a few days, leaving the applied film with no evidence of its use during the application phase. The color additives temporarily impart color to an otherwise clear coating, and subsequently dissipate over a short period of time. An embodiment of this technology includes the addition of a compatibilizer carrier solution to increase the ease of measuring the dye for addition to the clear coating.

20 Claims, 2 Drawing Sheets

COLOR VARIATION DUE TO FILM THICKNESS

VARIATION DUE TO CONCENTRATION

METHOD FOR CONTROLLING WET FILM THICKNESS OF CLEAR COATINGS BY MEANS OF COLOR-DISSIPATING DYE

This application claims the benefit of U.S. Provisional Application No. 60/113,498, filed Dec. 22, 1998.

BACKGROUND OF THE INVENTION

This invention relates to protective coatings on decorative compositions and, more specifically, for formulas that facilitate the application thereof. For convenience, the words "clear coating(s)" will be frequently used herein as a generic term for components that are essentially water-white. This invention is particularly concerned with colorants that may temporarily impart color to these otherwise clear coatings, the color dissipating over a relatively short period of time. A further aspect of the invention is a method of designing the concentration of colorant such that the opacity is minimal, thus making it possible to utilize the translucent feature to judge the film thickness.

The function of a clear coating is that, when uniformly applied, it improves the service life and protection afforded by the coating system. Modern high performance coatings are often chosen based upon their ability to maintain their color and gloss over long periods. It has been an aim of manufacturers to achieve more permanency and fastness of color to resist fading for as long as possible. Clear coatings, especially those that are resistant to UV light deterioration, have been found to be highly effective in providing a means to this goal. Clear coatings can be formulated such that they improve the color stability and gloss retention of a base coat and reduce the tendency of color pigments, associated with these base coats, to fade in sunlight. However, to be effective, they must be applied uniformly.

In the past, applying a clear coat at a uniform film thickness over a previously coated surface, especially one that has a high gloss, has been a problem. The applicator has difficulty with the control of the uniformity of wet film thickness since it is difficult to observe the amount of coating that has been applied. Such a limitation is a serious problem, since the amount of protection which the clear coating provides to the underlying base coat (a pigmented coating) is affected by the thickness of the clear coat. If the clear coat is applied at a film thickness that is less than the designed minimum, the resistance to ultra-violet (UV) light transmission through the clear coat is compromised, and the coating's function is compromised. The result is an undesirable variation in color uniformity observed after a period of time.

For the foregoing reasons, there is a need for a paint additive that allows an applicator to judge the thickness of a clear coating film that is being applied to a substrate.

SUMMARY OF THE INVENTION

Protective clear coatings can be applied over colored base coats in order to protect the pigmented base coats from deterioration by UV light. It is important that film thickness be uniform. The present invention is directed to a chemical composition that satisfies the need for a paint additive that aids the applicator in determining that the coating film is being applied at the correct film thickness and uniformity.

This discovery involves a chemical composition comprising a color-dissipatable dye that is unstable when exposed to UV light. The exposure to sunlight (either direct or diffuse) of this novel combination of clear coating and color-dissipatable dye results in the color being dissipated by photo chemical or thermal, oxidation and/or reduction. When mixed with the coating at the proper concentration, the result is a coating that provides a translucent color that has limited opacity and thus reveals thin versus thick film build. Because the colorant dissipates, the return to the "clear coating" appearance takes place within a reasonable timeframe, preferably from hours to a few days in a typical formula composition.

An embodiment of this invention is a composition comprising a color-dissipatable dye preferably one selected from a group of dyes including basonyl green, basonyl blue, pylam blue, trialmethanes; flexo yellow, diarylmethane; FD&C #2 indigotene; FD&C #2 lake; FD&C #1, FD&C #3 green, triphenylmethanes; FD&C #1 lake; FD&C #5 yellow, erythrosine lake; and FD&C #5 yellow lake.

The preferred application of this technology is realized in the form of a dissipating colorant being introduced into an otherwise clear coating, where the polymeric composition of the clear coating is selected from a group including acrylic, urethane, epoxy, or polyester. In all of these polymeric options, the product can be delivered in either waterborne, solvent, or 100% solids (i.e. solvent-free) form.

Another embodiment of this technology involves a color-dissipating coating composition that incorporates a compatibilizer carrier solution selected to increase the ease of measuring the dye for addition to the clear coating composition, to which is added a light-unstable dye. The dye mixture is further selected to facilitate the tolerance of the dye when mixed into the clear coating composition. The dye carrier is selected from a group including water, glycerin, propylene glycol, sodium benzoate, hydroxyl propyl methylcellulose, aromatic, aliphatic and oxygenated solvents.

An objective of this invention is to provide a method of making an "applicator-friendly" clear coating that exhibits a translucent coloring, said color permitting the visual detection of uniform application, said color dissipating over a relatively short period of time when exposed to one or more of the dissipation-promoting conditions of photochemical or thermal, oxidation and/or reduction, depending on the chemical composition of the dye. A second objective is to provide a practical and highly reliable mechanism for delivering a uniform protective film, which will subsequently protect a substrate from deterioration caused by weathering. A third objective is to describe the techniques to be used to obtain a composition having color sufficient to obtain the desired color contrast, such that the coating provides the performance objectives. A fourth objective is to describe techniques for incorporating the colorants into clear coating formulae that are routinely used in this service.

Another objective of this disclosure is to define the method of applying a protective coating having enough color strength that an applicator is provided with a means for easily determining where said coating has been applied, which encompasses the lifetime requirements for the color-dissipating dye component incorporated in said composition previously described, whereupon color of the light-unstable dye will have proceeded to disappear.

Another objective of this invention is to provide a method which provides a means for avoiding skips and thin spots (holidays) in a freshly applied clear coating and which also provides a means for accenting sags and runs in an applied clear coat by means of the color contrast which exists between the desired film thickness and a high film thickness associated with such sags and runs.

These and other features, aspects, and advantages of the present invention will become better understood with reference to the following description and appended claims.

DETAILED DESCRIPTION OF THE PREFERRED EMBODIMENTS

Figure 1:
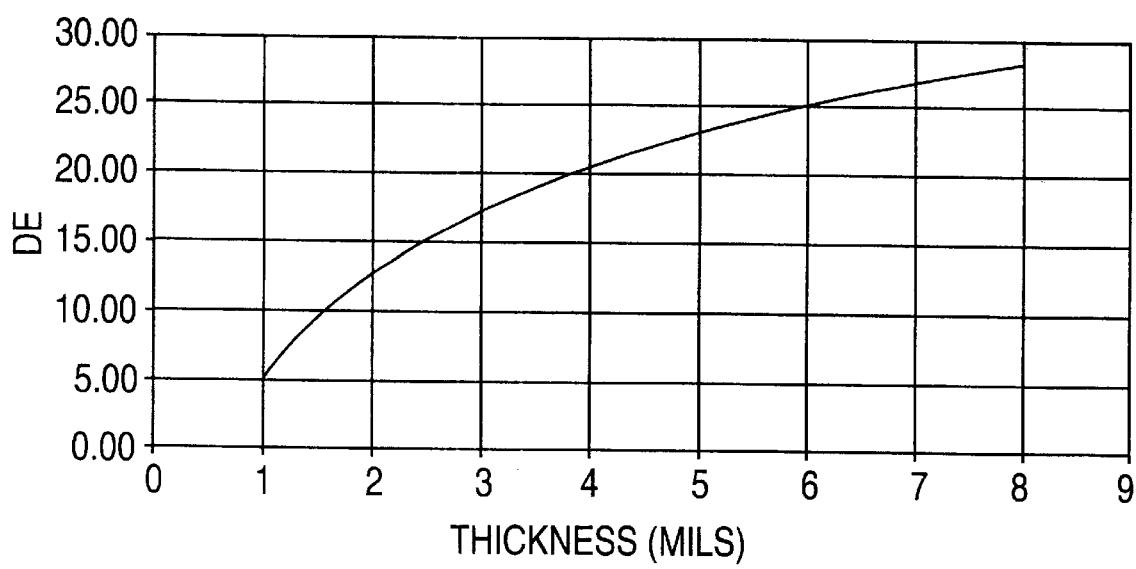
FIG. 1 is a chart showing the relationship between DE units and film thickness, in accordance with the present invention.

The invention is illustrated by means of the following illustrative, but non-limiting examples: Technologies are well established for producing dyes and colorants that exhibit poor light stability characteristics. Two typical dyes of this category are indigotene blue and triarylmethane green. Upon exposure to UV light, a chain-scission phenomenon occurs which causes a dissipation of the dye. This is achieved by oxidization, reduction, exposure to light, or a combination thereof.

Temporary change of color: When added to a coating material that is difficult to see, the result is a color that is reversible over a reasonable period of time. See below a formulation of a standard polyurethane acrylic composition.

Representative Polyurethane Acrylic Coating

|  |  | Range |
| --- | --- | --- |
| Component I |  |  |
| Desmophen A LS-2945 | 37.45 | 35.00–40.00 |
| Desmophen 631A-75 | 17.47 | 15.00–20.00 |
| CAB 381 - 0.1 (10% in MPA) | .67 | .60–.74 |
| Acronal 700L | .13 | .10–.16 |
| Tinuvin 1130 | .67 | .60–.74 |
| Tinuvin 292 | .67 | .60–.74 |
| Exxate 700 | 2.61 | 2.25–3.00 |
| n-Butyl Acetate | 10.45 | 10.00–11.00 |
| Methyl Amyl Ketone | 2.61 | 2.25–3.00 |
| Component II |  |  |
| Desmodur N-3300 | 27.60 | 25.00–30.00 |
|  | 100.00 |  |

Preferred dyes are those which are known to have relatively poor light stability. Dyes may vary as to light sensitivity; however, the light-fastness does not depend solely on the light itself, it is also governed, to a large extent, by the concentration of the dye, the thickness of the coating, the nature of the binder and the temperature of the substrate and surroundings. A critical parameter could be the reaction of the dye to oxidizing agents, reducing agents, drying time, etc. Consideration is therefore required to equate the constituents and the amount best suited to the type of dye and characteristics desired in the dissipating color application thereof.

Generally it is preferred that the dye color dissipate in hours or days. Also relevant to the selection of the dye is the reaction of the dye with the coating constituents, pH factor, solubility, length of pot life, storage expectations and performance of paint during application. The following Example A describes the dye/colorant composition used in the polyurethane coating above.

EXAMPLE A

Basonyl, TRM, Violet, Manufactured by BASF Corp., 36 Riverside Ave., Rensselaer, N.Y.

| Composition | Amount to 100 parts paint by weight (as measured) | Range |
| --- | --- | --- |
| 5.30 Basonyl Violet 610 | .0010 | .0009–.0011 |
| 63.13 Methyl Amyl Ketone | .0119 | .0115–.0120 |
| 31.57 Isopropyl Alcohol | .0060 | .0055–.0065 |

In actual test conditions, the compositions and the added dye are uniformly mixed and are coated on a specially prepared white paperboard substrate, such as that made by Leneta Co. A metal-bar coater, such as that manufactured by P.G.&T. Co., is used to apply the paint (drawndown), a uniform coating at wet film thicknesses of 1.5 mils, 2 mils, 4 mils, 6 mils, 8 mils. The thus coated paperboard is cured in absence of light. Color strength can be measured, followed by exposure to exterior ambient sunlight and the color difference is measured using a spectrophotometer. The rate of color dissipation can be reported. The end point is defined as the condition when the dye is no longer observable on the paint cards when compared to a control. The control consists of a paint card of the type listed above, overcoated with the representative coating without the addition of the dye.

TABLE I

COLOR VARIATION DUE TO FILM THICKNESS AT CONSTANT CONCENTRATION

| Mils. | 1.5 | 2.0 | 4.0 | 6.0 | 8.0 |
| --- | --- | --- | --- | --- | --- |
| *DE | 10.04 | 13.80 | 20.69 | 24.98 | 28.45 |

*Average of 3 films, 6 readings (FMCII Ill. D65)

The data presented in Table I and FIG. 1 was developed using Datacolor, Intl., spectrophotometer Model SF-600CT using sphere geometry. "DE" is defined as the change of energy which is measured using FMCII under illuminant 065 using a 10° standard observer. It is generally recognized and accepted that the average human eye can readily detect a color difference of two "DE" units. This mechanism shows that the color difference in the low film thickness range of 1 mil to 2 mils, a variation of one-half mil is detectable at this specific concentration. In FIG. 1, the higher film thickness range is less sensitive. However, an observer of normal visual skills can readily differentiate between a 4 mil thick film and a 6 mil thick film. Therefore, the average human observer using the naked-eye could observe variations as small as half a mil at thicknesses of 1 mil to 2 mils and a variation of 1 mil at thicknesses between 4 mils and 6 mils. In the case of the composition of Example A and the polyurethane formulation, it was observed that the dye dissipates slowly enough to permit sufficient working life to permit one to complete the coating application task.

TABLE II

COLOR VARIATION DUE TO CONCENTRATION AT CONSTANT FILM THICKNESS (2 MILS)

| Concentration | 0.001 | 0.002 | 0.003 | 0.004 | 0.005 | 0.006 | 0.007 |
| --- | --- | --- | --- | --- | --- | --- | --- |
| *DE |  | 6.80 | 13.80 | 20.42 | 24.83 | 26.42 | 30.48 | 33.91 |

*Average of 3 films, 6 readings (FMCII Ill. D65)

Figure 2:
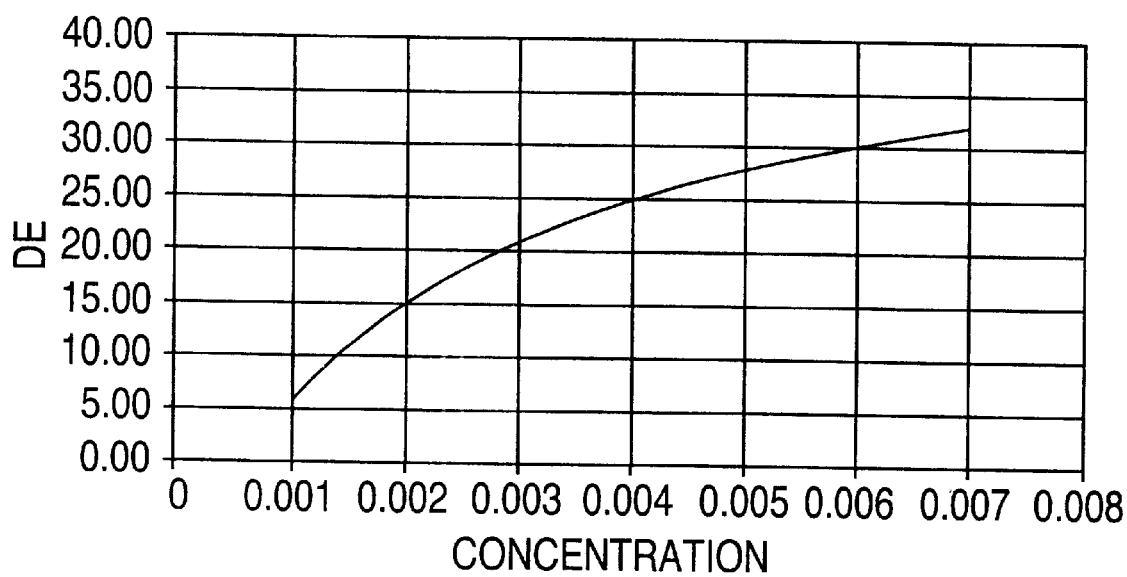
FIG. 2 is a chart showing the relationship between DE units and dye concentration with respect to a coating, in accordance with the present invention.

The data presented in Table II and FIG. 2 was also developed using the method described above. It shows the relationship between colorant concentration and the DE value. The relationship of concentration and film thickness demonstrates that the adjustment of concentration will affect the level of color change at various film thicknesses. This allows adjustment of concentration to improve the visual effect at different film thicknesses. It should be clear that the dissipation of the dye is affected by the following parameters: the type of dye, the concentration, and the film thickness.

Dyes exist that can exhibit color signature for as many as seven days or longer. Others dissipate as quickly as 15 minutes, depending upon the combination of dye, embodiments, concentration of UV, presence of oxidizers or reducers, and the pH of the coating media.

Dyes that have been found to be useful in this invention are:
- triarylmethane blue
- diarylmethane yellow
- blue indigotene
- triphenylmethane blue
- yellow pyrozoine
- eyrthrosine yellow lake Dye carriers are important for delivering the dye to the coating composition because they facilitate the introduction of the dye into the composition; they can also improve compatibility. Another benefit of a dye carrier is the measuring of tiny amounts of the dye for addition to the clear coating. Typically, the dye is dissolved in the carrier prior to the addition to the coating or other composition (see Example A).

The procedures used for developing the dye and carrier composition that is described in Example A involved the introduction of dye into the methyl amyl ketone and isopropyl alcohol solution and the continuous agitation of this mixture for approximately 10 minutes. The resulting colorant solution was packaged in a polyethylene vial in appropriate volume and placed in an aluminized Mylar bag for protection from light during transport and storage.

While not wishing to be bound by theory, it appears that isopropyl alcohol used with certain dyes will maintain the stability of the dye under normal environmental thermal conditions, when not exposed to UV light.

What is claimed is:

1. A method for controlling the applied film thickness of a clear protective coating comprising the steps of:
   applying a mixture of a clear coating and a color-dissipating dye over a colored base, wherein the color-dissipating dye is mixed with the clear coating at a concentration that is sufficient to allow a user to see the applied mixture to ensure a more uniform application thereof; and
   determining the thickness of the applied mixture by visual inspection,
   wherein the color-dissipating dye in the applied mixture dissipates its color over time when exposed to UV light.

2. The method of claim 1 wherein a color contrast between the clear coating layer and the colored base is sufficient to permit a user to differentiate between an acceptable and unacceptable thickness of the applied coating by means of the color contrast.

3. The method of claim 2 wherein the color-dissipating dye that is used to produce the color contrast disappears after a pre-determined period of time, to leave a clear film that exhibits no appearance of the original color.

4. The process of claim 3 wherein the color-dissipating dye is introduced into the clear coating just prior to coating application, thereby minimizing the possibility of storage instabilities.

5. The process of claim 2 where inspection of the film thickness is carried out using visual standards.

6. The process of claim 5 wherein the film thickness varies from 4 mils to 6 mils.

7. The process of claim 2 wherein regions of inadequate coating, skips and thin spots in an applied clear coating can be determined.

8. The process of claim 7 wherein said regions of inadequate coating, skips and thin spots in a freshly applied clear coating can be eliminated by applying additional clear coating.

9. The process of claim 2 wherein sags and runs the in an applied clear coat can be accented by the color contrast which exists between the desired film thickness and a high film thickness associated with such sags and runs.

10. The method of claim 1 further comprising the addition of a compatibilizer carrier to the dye which results in improved stability and compatibility of the dye, thereby enhancing the performance as a thickness-indicating medium.

11. The method of claim 10 further comprising dissolving said dye in said dye carrier prior to the addition to the clear coating.

12. The method of claim 10 wherein said compatibilizer carrier is selected from the group consisting of water, glycerin, propylene glycol, sodium benzoate, hydroxyl propyl methylcellulose, aromatic, aliphatic and oxygenated solvents.

13. The method of claim 1 wherein said color-dissipating dye is selected from the group consisting of basonyl green; basonyl blue; pylam blue; trialmethanes; flexo yellow; diarylmethane; FD&C #2 indigotene; FD&C #2 lake; FD&C #1; FD&C #3 green; triphenylmethanes; FD&C #1 lake; FD&C #5 yellow; erythrosine lake; and FD&C #5 yellow lake.

14. The method of claim 1 wherein said clear coating is selected from the group consisting of acrylic, urethane, epoxy, and polyester.

15. The method of claim 1 wherein the clear coating is a polyurethane acrylic and the dye comprises 0.009–0.0011 wt % Basonyl Violet 610, 0.0115–0.0120 wt % Methyl Amyl Ketone and 0.0055–0.0065 wt % Isopropyl Alcohol.

16. The method of claim 15 wherein the change in energy varies from approximately 10 "DE" units to approximately 28.5 "DE" units at film thickness from 1.5 mils to 8.0 mils, respectively.

17. A method for determining the film thickness of a clear protective coating comprising the steps of:
   applying a mixture of a clear coating and a color-dissipating dye over a colored base, wherein the color-dissipating dye is mixed with the clear coating at a concentration that is sufficient to allow a user to see the applied mixture to ensure a more uniform application thereof;
   visually observing a color of the applied mixture over all portions of the colored base on which the applied mixture is applied; and
   wherein a substantially uniform thickness of the applied mixture is obtained by the user maintaining a substantially same color of the applied mixture over all portions of the colored base, as determined visually by the user, and
   wherein the color-dissipating dye in the applied mixture dissipates its color over time when exposed to UV light.

18. The method according to claim 1, further comprising the step of applying more coating to regions where the coating is too thin.

19. The method according to claim 1, wherein a concentration of the color-dissipating dye with respect to the clear coating in the applied mixture is within a range of from 0.001 to 0.007, wherein a specific concentration value is obtained base on a specific desired thickness of the clear coating to be applied to the colored base, and wherein a change in thickness of the applied mixture of at least 1 mil between a first region where the applied mixture was applied and a second region where the applied mixture was applied, can be determined by visual inspection of a color difference of the applied mixture in the first and second regions.

20. The method according to claim 17, wherein a concentration of the color-dissipating dye with respect to the clear coating in the applied mixture is within a range of from 0.001 to 0.007, wherein a specific concentration value is obtained base on a specific desired thickness of the clear coating to be applied to the colored base, and wherein a change in thickness of the applied mixture of at least 1 mil between a first region where the applied mixture was applied and a second region where the applied mixture was applied, can be determined by visual inspection of a color difference of the applied mixture in the first and second regions.

* * * * *